United States Patent [19]
Ruetman

[11] 3,923,860
[45] Dec. 2, 1975

[54] VAPOR PHASE CHLORINATION OF ACETONITRILE IN THE PRESENCE OF WATER

[75] Inventor: Sven H. Ruetman, Walnut Creek, Calif.

[73] Assignee: The Dow Chemical Company, Midland, Mich.

[22] Filed: Aug. 8, 1974

[21] Appl. No.: 495,711

[52] U.S. Cl. .............................................. 260/465.7
[51] Int. Cl.² ........................................ C07C 120/00
[58] Field of Search ................................. 260/465.7

[56] References Cited
UNITED STATES PATENTS 2,375,545  5/1945  Foster .............................. 260/465.7
3,121,735  2/1964  Henry, et al. ..................... 260/465.7

*Primary Examiner*—Joseph P. Brust
*Attorney, Agent, or Firm*—R. R. Stringham

[57] ABSTRACT

Acetonitrile is reacted with from 6 to 100 molecular proportions of chlorine for from 2 to 50 seconds at temperatures of from 350°–500°C. in the presence of from one to 50 molecular proportions of steam. No catalyst is required. While trichloroacetonitrile is the predominant product, substantial proportions of the lower chlorinated acetonitriles may be co-produced at lower temperatures within the specified range.

4 Claims, No Drawings

VAPOR PHASE CHLORINATION OF ACETONITRILE IN THE PRESENCE OF WATER

BACKGROUND OF THE INVENTION

Vapor phase chlorination of acetonitrile is a known method for the production of monochloro- and trichloroacetonitrile. U.S. Pat. No. 2,375,545 is directed to the use of active carbon or carbon impregnated with a chloride of copper, zinc or an alkaline earth metal, as a catalyst for the vapor phase production of trichloroacetonitrile. U.S. Pat. No. 2,426,091 is directed to a similar process in which the catalyst is a noble metal or an oxide or chloride, in porous form or on a supporting carrier. In the processes of both of these patents, at least a stoichiometric proportion of chlorine is used.

U.S. Pat. No. 3,121,735 is directed to the vapor phase production of monochloro-acetonitrile. No catalyst is required but the mole ratio of chlorine to acetonitrile is 1/3 or less and a relatively low conversion per pass is taken.

Characteristically, substantial amounts of carbon tetrachloride and cyanogen chloride are co-produced under the conditions conventionally employed in the vapor phase production of trichloroacetonitrile. Cyanogen chloride is a useful intermediate but is highly toxic and can be made more cheaply by other routes.

It is also characteristic of prior art processes that either monochloro- or trichloroacetonitrile is predominantly produced, substantially to the exclusion of dichloroacetonitrile.

It is an object of the present invention to provide a vapor phase chlorination process which not only requires no catalyst but is also controllable to yield either substantial proportions of dichloroacetonitrile, or almost exclusively the trichloro compound. It is also an object to provide such a process in which the formation of cyanogen chloride can be minimized and wherein any cyanogen chloride which is formed is converted in-situ to innocuous by-products ($CO_2$ and $NH_4Cl$).

SUMMARY OF THE INVENTION

It has now been discovered that the foregoing objects are attained and other advantages realized if the vapor phase chlorination of acetonitrile is carried out with excess chlorine in the presence of steam.

More precisely, the present invention is a process for the vapor phase production of dichloro- and trichloroacetonitrile, comprising introducing into a reaction zone, with rapid turbulent mixing, one molecular proportion of acetonitrile vapors, from about 6 to about 100 molecular proportions of chlorine gas and from about one to about 50 molecular proportions of steam, and maintaining the resultant mixture in said zone at a temprature within the range of from about 350° to about 500°C. for a period of from about 2 to about 50 seconds.

DETAILED DESCRIPTION OF THE INVENTION

Vaporizer and Reactor

The reactants and diluent may be vaporized and introduced to the reactor in any suitable fashion, providing that they are introduced under conditions of turbulent flow so that rapid mixing results. The acetonitrile, chlorine and water may be vaporized and/or preheated separately or in any combination. In a particularly suitable mode of operation, an aqueous solution of acetonitrile is vaporized in a suitable preheater and then combined with gaseous chlorine in a nozzle just prior to being introduced to the reactor.

Although no preheater temperature is critical, the temperature in each preheater employed should be at least high enough to ensure that the liquid (acetonitrile, water or both) passing through it is fully vaporized before entering the reactor. In general, preheater exit temperatures within the range of about 200° to 250°C. are suitable. Any suitable vaporizing device may be employed as a preheater but a wiped film evaporator has been found particularly convenient.

The chlorination reaction is carried out in any suitable reactor in which the reaction mixture can be subjected to proper conditions as above defined.

A particularly suitable reactor configuration is that of a vertical column having a length to diameter ratio of about 5 to 1, the reactants being passed through the column in either up-flow or down-flow, preferably, the latter.

The hot, gaseous effluent from the reactor may be condensed, collected and worked up in any appropriate manner, utilizing techniques conventional for such procedures. It is a particular advantage of the present process that unconverted acetonitrile is readily separated from the chlorinated acetonitrile products simply by virtue of the difference in their solubilities in water. If the effluent is cooled sufficiently, it will condense and form two readily separable phases; a lighter, aqueous phase containing any unreacted acetonitrile and a heavier, chlorinated acetonitrile phase. The constituents of the latter phase can be separated by conventional fractional distillation methods.

REACTION PARAMETERS

To ensure the requisite rapidity of mixing the reactants, the turbulence within the mixing zone in the reactor should be such as to provide a Reynolds number of at least 800. The preferred Reynolds number is about 2,000 but in the situation where an abrupt increase in flow path cross-section occurs, as where the feed vapors are combined as they enter the reactor through a small orifice, a Reynolds number as low as 800 will result in adequate turbulence. Generally, an inlet vapor velocity of about 1,000 to about 15,000 cm/sec is desirable.

Operating pressures are not critical and may vary from subatmospheric to somewhat superatmospheric. Atmospheric pressures are satisfactory and are preferred.

The temperature within the reaction zone should be held within the range of from about 350° to about 500°C. The proportion of acetonitrile converted to carbon tetrachloride (and cyanogen chloride) is directly dependent on the temperature employed. A sharp increase in carbon tetrachloride make occurs between 460° and 500°C. At temperatures of 425° and less, the reaction products include only one percent or less of carbon tetrachloride. At temperatures below about 450°, the yield of dichloroacetonitrile becomes substantial and the yield of the trichloro compound decreases accordingly. Thus, a temperature range of about 440° to about 455° is preferred for maximal production of trichloroacetonitrile. For maximal production of the dichloro compound, temperatures below about 425° are preferred.

The residence time in the reaction zone should be controlled within the range of from about 2 to about 50 seconds. The effect of residence time on the product composition is of course dependent on temperature and, to a lesser extent, on reactant ratios, in accordance with known principles. The optimum residence time and temperture for any particular product composition is readily determinable by means of several laboratory runs. However, such optimal times will generally reside within the range of about 8 to about 14 seconds.

The mole ratio of chlorine to acetonitrile in the feed to the reactor should be within the range of from about 6/1 to about 100/1. At ratios substantially below about twice the stoichiometric requirement (3/1) for trichloroacetonitrile production, poor acetonitrile conversions result and monochloroacetonitrile formation is favored. Ratios within the range of about 10/1 to about 15/1 provide an excess of chlorine which is beneficial to reaction rates and minimizes the opportunity for reactions of acetonitrile with chlorinated acetonitriles (rather than with chlorine). Higher ratios are decreasingly of further benefit and ratios above about 100/1 are simply wasteful of reactor space.

The mole ratio of water to acetonitrile in the reactor feed should be within the range of from about 1/1 to about 50/1. This corresponds to an aqueous acetonitrile feed containing about 70 to about 4 weight percent of acetonitrile. Preferably, the ratio is within the range of from about 1.5 to about 9 moles of water per mole of acetonitrile (~60 to ~20 wt. percent acetonitrile). No hydrolysis of the chlorinated nitrile products or of unconverted acetonitrile has been detected, so this is not a consideration in selecting an operating ratio. At least about a 1/1 molecular proportion of water (steam) is essential to provide moderation and good temperature control, to react out any cyanogen chloride which may be formed and to provide an aqueous phase of sufficient volume to effectively separate any water soluble components of the reactor effluent from the chlorinated products. Ratios above about 50/1 are excessively wasteful of reactor space, result in decreased rates of reaction and are of no further benefit.

Catalysis of the reaction is neither necessary or preferred but may be practiced, provided that a catalyst is employed which does not detrimentally interact with any component of the reaction mixture. Conveniently, such a catalyst — a noble metal oxide or chloride, for example — may be provided as a component of a fluidized bed or a packed section in the reactor.

SPECIFIC EMBODIMENTS

General Procedure

A laboratory vapor phase chlorinator was assembled with a vertical, insulated, electrically heated reactor made of "Vycor" glass and having a length to diameter ratio of 5/1 and a volume of 6.1 liters. Pressurized feed (an aqueous solution of acetonitrile) was forced through a rotameter into a preheated tubular vaporizer. The vaporizer exit was kept at ~200°–250°C. The hot feed vapors were than combined in a nozzle with excess chlorine (metered through another rotameter and immediately jetted downwardly through a small orifice (0.25 cm in diameter)) in the top of the heated reactor. After a short residence time the hot effluent gases were removed at the bottom and condensed in a series of three ice-cooled water traps. The product was recovered by combining the contents of all traps and separating the heavy organic phase from the aqueous layer. The organic phase was washed once with water, once with saturated aqueous sodium bicarbonate solution, and then twice with water. The organic layer was then dried over anhydrous magnesium sulfate and analyzed by gas/liquid chromatography (Glc). The major components were identified by their infrared (IR) scans and their retention times. Further purification of trichloroacetonitrile could be carried out by vacuum distillation. An additional small amount of trichloroacetonitrile could be recovered by extraction of the water phase, as for example with $CCl_4$.

EXAMPLE 1

| | |
|---|---|
| Feed | 20.16% by wt. acetonitrile in $H_2O$ |
| Reactor temperature | 447°C. |
| Vaporizer exit temperature | ~235°C. |
| Feed rate | 4.19 g/min |
| $Cl_2$ rate | 18 g/min |
| $Cl_2$/acetonitrile molar ratio | 12/1 |
| Residence time | 9.6 sec. |
| Nozzle velocity | 12,980 cm/sec. |
| Product weight | 215 g |
| Product Glc Analysis: | |
| Unknown light ends | 0.1 M% (mole percent) |
| $CCl_4$ | 7.2 M% |
| $Cl_3CCN$ | 87.1 M% |
| $Cl_2CHCN$ | 5.0 M% |
| $ClCH_2CN$ | 0.1 M% |
| Unknown heavier ends | 0.3 M% |

The yield of trichloroacetonitrile actually recovered was 66 percent, based on the acetonitrile charged. No acetonitrile was detected in either the aqueous or organic phase but substantial volatile losses were known to have occurred due to the inefficiency of heat transfer in the condensers available for the experiment.

EXAMPLE 2

Using essentially the same reaction conditions as in Example 1, except that the reactor temperture was varied, the following product compositions were obtained:

| Reactor Temp. - °C | 425 | 460 | 500 |
|---|---|---|---|
| Mole % $CCl_4$ | 1.0 | 23.8 | 75.5 |
| Mole % $Cl_3CCN$ | 74.2 | 75.8 | 24.1 |
| Mole % $Cl_2CHCN$ | 23.7 | 0.3 | none |
| Mole % $ClCH_2CN$ | 0.8 | none | none |

UTILITY

Dichloro and trichloroacetonitrile have utility as chemical intermediates for the preparation of dichloro- and trichloroacetic acids and a variety of other products. Trichloroacetonitrile is a known (Kirk-Othmer, Encyclopedia of Chemical Technology, Vol. XX, page 719; 2nd edition) grain fumigant.

I claim:

1. A vapor phase chlorination process for the production of dichloro- and trichloroacetonitrile, comprising introducing into a reaction zone one molecular proportion of acetonitrile vapors, from about 6 to about 100 molecular proportions of chlorine gas and from about one to about 50 molecular proportions of steam, under conditions of flow such that rapid mixing results and the Reynolds number at the point of mixing is at least 800, and maintaining the resultant mixture in said zone at a temperature within the range of from about 350° to about 500°C. for a period of from about 2 to about 50 seconds.

2. The process of claim 1 wherein said temperature is within the range of about 440° to about 455°C.

3. The process of claim 1 wherein said temperature is below about 425°C.

4. The process of claim 2 wherein the residence time is from about 8 to about 14 seconds and the mole ratio of chlorine to acetonitrile is from about 10/1 to about 15/1.

* * * * *